June 26, 1923.

A. G. McKEE 1,459,982

METHOD OF AND APPARATUS FOR CLEANING GASES

Filed March 29, 1920    2 Sheets-Sheet 1

INVENTOR:
Arthur G. McKee
BY
Frank L. Sessions
ATTORNEY.

June 26, 1923.
A. G. McKEE
1,459,982
METHOD OF AND APPARATUS FOR CLEANING GASES
Filed March 29, 1920    2 Sheets-Sheet 2
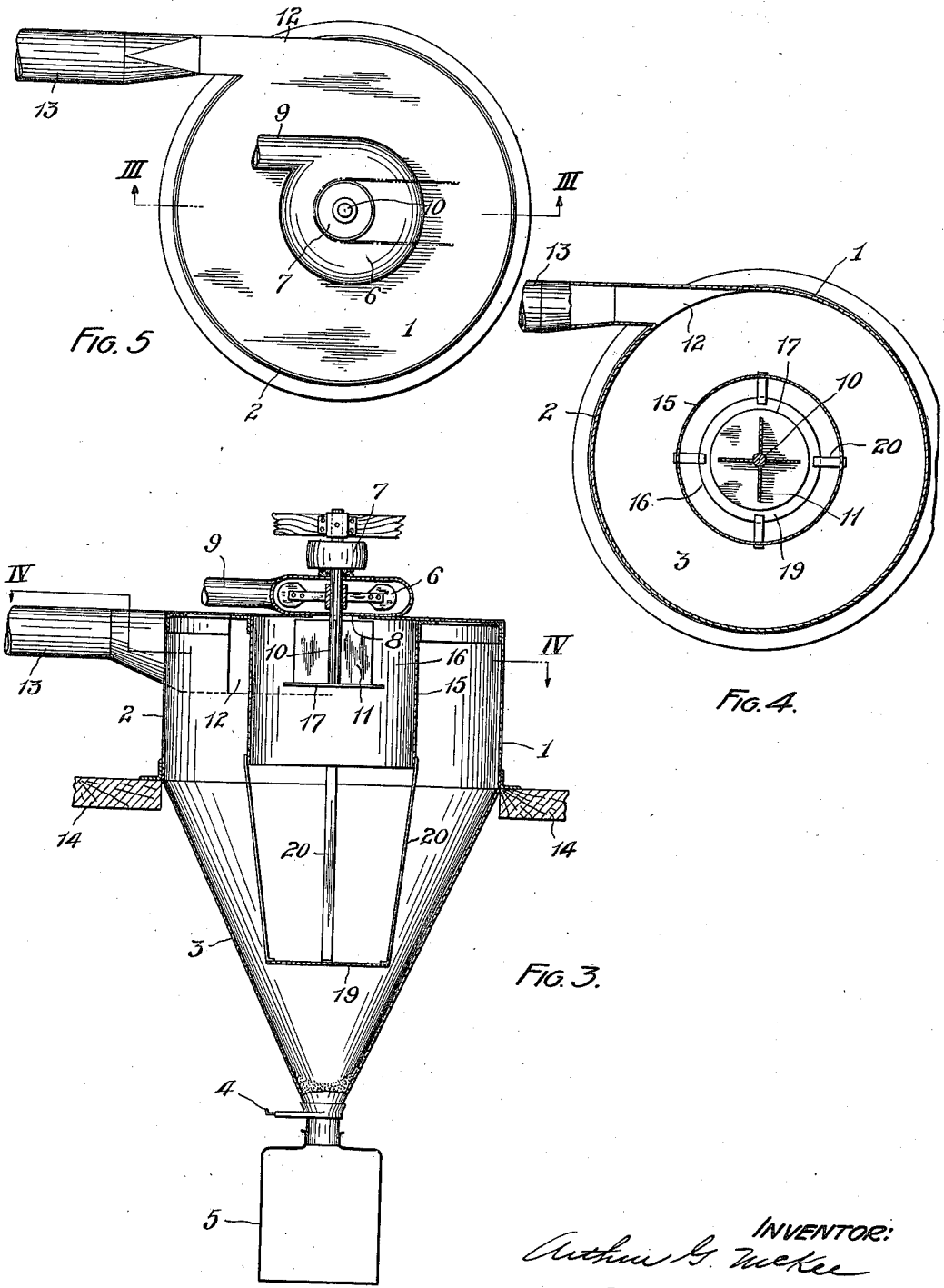

Patented June 26, 1923.

1,459,982

UNITED STATES PATENT OFFICE.

ARTHUR G. McKEE, OF CLEVELAND, OHIO.

METHOD OF AND APPARATUS FOR CLEANING GASES.

Application filed March 29, 1920. Serial No. 369,563.

*To all whom it may concern:*

Be it known that I, ARTHUR G. MCKEE, a citizen of the United States, residing at Cleveland, in the county of Cuyahoga and State of Ohio, have invented certain new and useful Improvements in Methods of and Apparatus for Cleaning Gases, of which the following is a specification.

My invention relates to a method of and apparatus for cleaning gases by removing therefrom the particles of foreign matter carried by them.

Among the objects of my invention are the provision of a new and useful method of cleaning gases whereby very minute particles or impalpable dust carried in suspension by the gases to be cleaned as they enter the cleaning apparatus are almost if not quite completely removed from the gas; and the provision of an apparatus suitable for carrying out my method.

Figure 7:
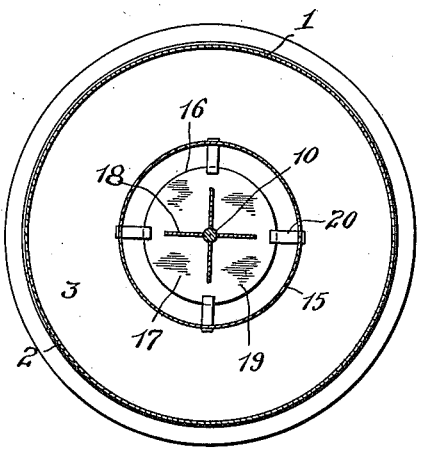
Figure 6:
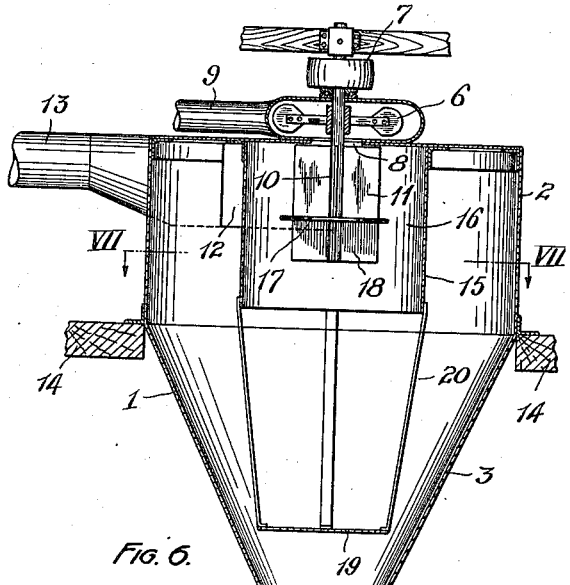
Figure 1:
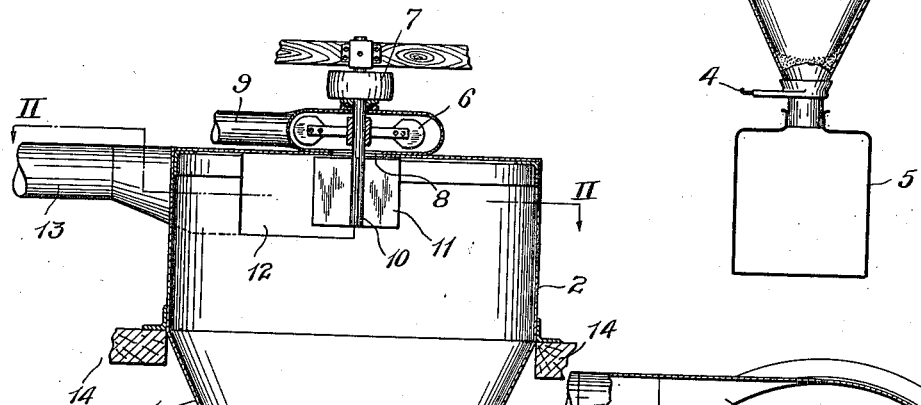
Figure 2:
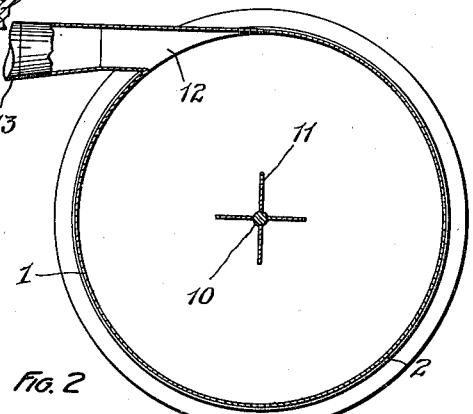

A full and clear description of my invention is given in the following specification and shown in the accompanying drawings in which Fig. 1 is a vertical section of an apparatus suitable for carrying out my method; Fig. 2 is a horizontal section on line II—II of Fig. 1; Fig. 3 is a vertical section through another form of apparatus suitable for carrying out my method; Fig. 4 is a horizontal section on line IV—IV of Fig. 3; Fig. 5 is a plan view of the apparatus shown in Fig. 3; Fig. 6 is a vertical section through another form of apparatus suitable for carrying out my method; and Fig. 7 is a horizontal section on line VII—VII of Fig. 6.

In the drawings 1 represents the housing of a cyclone dust collector of well known construction. The upper portion, 2, of this housing is cylindrical and the lower portion, 3, consists of an inverted conical shell following the usual proportions and construction of this form of apparatus. At the bottom of the inverted conical portion, 3, of the housing, 1, there is provided a valve or door, 4, and a receptacle, 5, into which receptacle the dust particles or other foreign matter removed from the gases gravitate when the valve, 4, is open.

On top of the housing, 1, there is preferably mounted a fan or blower, 6, which may be driven from any suitable source of power. In the drawings there is shown a belt pulley, 7, which may be belted to any convenient driving pulley. Instead of this form of power connection it will be understood that a direct connected motor of any sort or any other driving means may be employed.

An opening, 8, at the center of the top of housing, 1, is connected to the intake of the fan or blower, 6, and the discharge from the fan or blower, 6, may be conducted to any suitable point or apparatus through the discharge pipe, 9.

Mounted upon an extension of the shaft, 10, of the fan or blower, 6, and secured thereto for rotation therewith is a rotor, 11, which is adapted to rotate within the housing of the cyclone dust collector whenever the fan or blower, 6, is operating. The diameter of the rotor, 11, is preferably somewhat greater than that of the outlet, 8, and the upper end of the rotor is in close proximity to the top wall of the housing surrounding the outlet opening.

The fan or rotor, 11, should be disposed closely adjacent to the wall of the housing surrounding the outlet opening, 8, so that whatever is in the space between the housing and the rotor will be subjected to the centrifugal action of the rotor to the end that while the rotor is operating nothing may pass out of the outlet which has not passed through the space described by the rotor.

The tangential inlet to the housing of the dust collector is shown at 12 to which inlet a suitable pipe or duct, 13, conducts the uncleaned gases from their source.

The housing, 1, may be supported by any suitable means such as the stationary support or floor, 14.

In the form of apparatus shown in Figs. 3, 4, and 5 there is provided a stationary cylindrical shell, 15, which surrounds the rotor, 11, but provides a considerable clearance space, 16, between the periphery of the rotor, 11, and the surrounding shell, 15. In this form of apparatus shown in Figs. 3 to 5 inclusive there is also shown a disc, 17, which is mounted upon the shaft, 10, below the blades of the rotor, 11, and is secured thereto for rotation therewith.

The form of apparatus shown in Figs. 6 and 7 is similar to that shown in Figs. 3, 4, and 5 with the addition of fan blades, 18, which are mounted upon and secured to the shaft, 10, for rotation therewith, below disc, 17.

In carrying out my method, the operation of the apparatus shown in the drawings and described above is as follows: Assuming that the inlet pipe, 13, is connected to a source of supply of uncleaned gas and that the fan or blower, 6, is being driven by power supplied to its shaft, 10, the suction created by the fan or blower, 6, will induce the uncleaned gas to enter the housing of the cyclone dust collector through the tangential inlet opening, 12, and, on account of its tangential entrance, to rotate within the housing in a manner that is well understood. It will be apparent to those skilled in the art, that the uncleaned gases may be caused to enter the cyclone chamber in the desired manner by other means than the suction of an exhaust fan such as shown at 6. For instance they may be blown into and through the cyclone chamber by a fan or blower discharging into duct, 13, or by other means.

The particles of foreign matter carried in by the gas will be thrown towards the wall of the cyclone chamber and will be rotated around in the chamber adjacent to the wall due to the whirling motion given to the uncleaned gas by its tangential entrance into the cyclone chamber. The velocity of these particles of foreign matter will be reduced by their frictional contact with the wall and they will gravitate down along the inner surfaces of the housing, 1, and be collected at the bottom of the inverted conical portion, 3, or in the receptacle 5. Centrifugal force will also aid in forcing the heavier particles outward towards the wall, and the sail area of the lighter particles will keep them largely in the stream of moving gases which will carry them also to the bottom of the chamber.

The gases thus cleaned of a large portion of the particles of foreign matter carried by them when they entered the cylindrical chamber flow to the center of the chamber and upwardly through the outlet, 8, through the fan or blower, 6, if it be employed and are discharged therefrom. In the usual form of cyclone dust collector the centrifugal action near the center or axis of the revolving column of gas is very small due in part to its low rotative speed and in part to the small diameter of this portion or zone of the column. From the well known formula, centrifugal force equals $\frac{WRn^2}{2936}$, in which W is the weight of the revolving body in pounds, R, the radius in feet of the circle in which the body devolves and $n$, the number of revolutions per minute, it will be seen that the centrifugal force near the center of the column is practically nothing.

As the gases enter at the periphery of the revolving column, and the outlet is at the center, it follows that they must travel radially inwardly of the column in order to leave it and as they approach the center the centrifugal action becomes so small that some of the particles of foreign matter are carried upward and out of the chamber. In order to prevent this undesirable action, according to my invention the central portion of the revolving column is given an additional or secondary rotating movement, much more rapid than that which it acquires on account of entering the cyclone chamber tangentially, so that in order to leave the chamber the gases must pass radially inwardly into this rapidly rotating zone or column. Particles of foreign matter which approach this rapidly rotating zone cannot penetrate it but are thrown outwardly into the zone of the primary rotating movement of the cyclone. In the apparatus shown in the accompanying drawings and described herein this secondary rapid rotating movement of the gases in the center of the chamber is imparted by the blades of the rotor, 11, so that virtually nothing but cleaned gas passes through the outlet, 8, to the cleaned gas or discharge duct, 9.

I have found that imparting to the central portion of the rotating column of gas within the cylindrical head such an additional rotating movement as I have described results in a much more complete separation of the particles of foreign matter from the gas than can be obtained without it.

In order to prevent any particles of foreign matter from entering the central zone of the rotating column from the bottom of the chamber without passing radially inwardly into it, there may be provided a stationary disc, 19, which may be supported by rigid supports, 20, from the cylinder, 15, at a distance above the bottom of the chamber, and below the outlet, 8. Any gases or particles of foreign matter which rise from the bottom of the chamber, must pass around this disc to enter the central, outgoing stream of gas. It will be understood that the movement of the gas or particles of foreign matter referred to herein as "radially" is not limited to a simple radial movement at right angles to the axis of rotation, but is any movement by which the distance of the gas or particles from the axis of rotation is changed. As the materials in the column have both rotary and longitudinal movement, the resultant path will obviously be a spiral.

In the recovery of lamp black and other impalpable powders the use of my method and apparatus results in recovering upwards of 98% of the foreign materials carried by the gases.

Having thus described my invention I claim:—

1. The method of cleaning air or other gas which consists of imparting a primary rotating motion to a column of the gas, constantly removing the particles of foreign matter from the zone of action of the rotating column rejected by centrifugal force, imparting to the central portion of the rotating column a secondary rotating motion whereby all of the outgoing gases are subjected to said secondary rotating motion, and withdrawing cleaned gas away from the center of said rotating column.

2. The method of cleaning air or other gas which consists of imparting a primary rotating motion to a column of the gas, constantly removing the particles of foreign matter from the zone of action of the rotating column rejected by centrifugal force, imparting to the central portion of the rotating column a secondary and more rapid rotating motion whereby all of the outgoing gases are subjected to said secondary and more rapid rotating motion and withdrawing cleaned gas away from the center of said revolving column.

3. The method of separating particles of foreign matter from a mixture thereof with air or other gas which consists of imparting a rotating motion to a radially confined vertical column of said mixture, whereby said particles of foreign matter are thrown radially outward to the periphery of said column and gravitate to the base thereof, imparting to the central portion of said column an additional rotating motion whereby all of the outgoing gases are subjected to said additional rotating motion and conducting the cleaned gas out of said central portion of said column.

4. The method of cleaning air or other gas which consists of imparting a rotating motion to a column of the gas whereby some of the particles of foreign matter carried by it are thrown centrifugally out of said column, causing the gas thus rid of a portion of said particles of foreign matter to flow inwardly towards the axis of said column, imparting an additional and more rapid rotating motion to the central portion of said column whereby all of the outgoing gases are subjected to said additional and more rapid rotating motion and withdrawing cleaned gas away from the center of said column.

5. The method of cleaning gases which consists of causing them to rotate in a circular confined space, imparting to the gases a higher rate of rotation near the center of the space than at its periphery whereby all of the outgoing gases are subjected to said higher rate of rotation and causing the cleaned gas to flow out of the central portion of said space.

6. The method of cleaning gases which consists of causing them to rotate in a circular confined space whereby particles of foreign matter carried by the gases are thrown to the periphery of said space by centrifugal force, causing the gases to flow radially inwardly toward the center of said space, subjecting them to greater centrifugal action as they approach the center of said space whereby all of the outgoing gases are subjected to said greater centrifugal action and causing the cleaned gas to flow out of the central portion of said space.

7. In apparatus for cleaning gases, the combination with a dust collector comprising a vertical housing of circular cross section having top and bottom closures and a tangential inlet through its side, said top closure having an outlet opening through it concentric with said housing, of means for causing gas to flow into said inlet opening and out of said outlet opening, a revoluble fan mounted for rotation within said housing having its axis coincident with the axis of said housing and the top ends of its blades in close proximity to said top closure whereby all of the outgoing gases pass through the space described by said fan and means for rotating said fan.

8. In apparatus for cleaning gases, the combination of a housing provided with a circular chamber having gas inlet and outlet openings, said outlet opening being at one end and at the center of said circular chamber, of means for imparting a rotating motion to the gases in said chamber near the periphery thereof, means for increasing the rotating motion of the gases near the center of said chamber whereby all of the outgoing gases are subjected to said of the increased rotating motion and means for causing a flow of gases through said chamber from said inlet to said outlet opening.

9. In a gas cleaner a housing provided with a cyclone chamber having a tangential inlet and a central outlet, means for causing gases to enter said inlet rotate in said chamber and pass out of said outlet, and means for imparting an additional rotary motion to all of the gases passing through said chamber.

10. The combination with a cyclone gas cleaner in which gases are subjected to centrifugal action due to their rotation on account of entering said cleaner tangentially, of other means for producing rotation of said gases near the center of said cleaner and means for causing all of the gases to pass out of said cleaner through the zone of action of said other means.

11. In a gas cleaner having a chamber in which the entering gases are given a rotary motion by reason of the manner of their entering the chamber, means for imparting an additional rotary motion to all of said gases within said chamber, and means for conducting gases away from the central portion of said chamber.

12. In a gas cleaner, a housing provided with a cylindrical chamber having a tangential inlet and a top central outlet, means for causing gas to enter said chamber through said inlet and to leave said chamber through said outlet, a revoluble fan in said chamber, said fan being supported with its end closely adjacent to said outlet whereby all of the outgoing gases pass through the space described by said fan, and means for driving said fan.

13. In a gas cleaner, a housing having a chamber in which the entering gases are given a primary rotary motion by reason of the manner of their entering the chamber, said chamber having an inlet and an outlet and a revoluble fan within said chamber adapted to impart to said gases a rotative speed faster than said primary rotary motion, said fan being so disposed that all of the outgoing gases pass through the space described by it.

14. In a gas cleaner, a housing provided with a chamber having a side inlet and an end outlet opening, means for causing gas to enter said chamber through said inlet and to leave said chamber through said outlet opening, and other means for imparting a high rotative speed to the gas within said chamber, said other means comprising a revoluble fan within said chamber adjacent to said outlet opening the axis of said fan being perpendicular to the plane of said outlet opening and the blades of said fan being in close proximity to the said opening whereby all of the outgoing gases must pass through the space described by said fan.

15. In a gas cleaner, a housing provided with a chamber having a cylindrical upper portion and an inverted conical lower portion, said upper portion having a tangential inlet opening and a top central outlet opening, said lower portion having a central outlet opening provided with a closure, a revoluble fan within said chamber adjacent to said outlet opening, the axis of said fan being coincident with the axis of said outlet opening, the blades of said fan being in close proximity to said outlet opening whereby all of the outgoing gases must pass through the space described by said fan, means for causing gas to enter said chamber through said inlet opening and to leave said chamber through said outlet opening and means for rotating said fan.

16. In a gas cleaner, a cyclone head in combination with a revoluble fan mounted for co-axial rotation with the gases in said cyclone head, said fan being immediately adjacent to the outlet of the cyclone head whereby all of the outgoing gases must pass through the space described by said fan.

17. In a gas cleaner having a chamber, in which the entering gases are given a primary rotary motion by reason of the manner of their entering the chamber, said chamber having an inlet and an outlet, means for causing gases to enter said chamber through said inlet and to leave said chamber through said outlet, means for imparting to the gases in the center of said chamber a more rapid rotary motion than that induced by the manner of their entering the chamber, said means being disposed so that all of the outgoing gases acquire said more rapid rotary motion.

In testimony whereof I affix my signature.

ARTHUR G. McKEE.